United States Patent
Le et al.

(10) Patent No.: US 10,679,006 B2
(45) Date of Patent: Jun. 9, 2020

(54) SKIMMING TEXT USING RECURRENT NEURAL NETWORKS

(71) Applicant: Google LLC, Mountain View, CA (US)

(72) Inventors: Quoc V. Le, Sunnyvale, CA (US); Hongrae Lee, Santa Clara, CA (US); Wei Yu, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/508,066

(22) Filed: Jul. 10, 2019

(65) Prior Publication Data

US 2019/0340236 A1    Nov. 7, 2019

Related U.S. Application Data

(63) Continuation of application No. PCT/US2018/028618, filed on Apr. 20, 2018.

(60) Provisional application No. 62/488,013, filed on Apr. 20, 2017.

(51) Int. Cl.
| G06F 40/284 | (2020.01) |
| G06N 3/08 | (2006.01) |
| G06F 40/289 | (2020.01) |
| G06N 3/04 | (2006.01) |

(52) U.S. Cl.
CPC ......... *G06F 40/284* (2020.01); *G06N 3/0445* (2013.01); *G06N 3/0454* (2013.01); *G06N 3/08* (2013.01); *G06F 40/289* (2020.01)

(58) Field of Classification Search
CPC .............. G06F 17/277; G06F 17/2775; G06F 17/2785; G06F 40/284; G06F 40/289; G06F 40/30; G06N 3/0445; G06N 3/0454; G06N 5/04

USPC .............................................. 704/9
See application file for complete search history.

(56) References Cited

U.S. PATENT DOCUMENTS

| 7,496,567 B1 * | 2/2009 | Steichen ............... G06F 16/353 |
| 10,083,169 B1 * | 9/2018 | Ghosh .................... G06F 17/279 |
| 10,277,628 B1 * | 4/2019 | Jakobsson ........... H04L 63/1483 |
| 2008/0033714 A1 * | 2/2008 | Gupta ................... G06F 17/277 704/9 |
| 2015/0039474 A1 * | 2/2015 | King ..................... G06Q 30/00 705/26.62 |

(Continued)

OTHER PUBLICATIONS

Cheng, Jianpeng, et al. "Long short-term memory-networks for machine reading." arXiv preprint arXiv:1601.06733, Sep. 2016, pp. 1-11. (Year: 2016).*

(Continued)

*Primary Examiner* — James S Wozniak
(74) *Attorney, Agent, or Firm* — Fish & Richardson P.C.

(57) ABSTRACT

Methods, systems, and apparatus, including computer programs encoded on a computer storage medium, for processing sequential data. In one aspect, a computer-implemented method includes receiving a request to generate a system output for an input data sequence, the input data sequence including a plurality of tokens. One or more tokens may be designated as tokens to be skipped. When a token has not been designated as a token to be skipped, the token is processed using a recurrent neural network to update a current internal state of the recurrent neural network. The system output is generated from the final internal state of the recurrent neural network.

21 Claims, 5 Drawing Sheets

(56) References Cited

U.S. PATENT DOCUMENTS

| | | | | |
|---|---|---|---|---|
| 2015/0309992 | A1* | 10/2015 | Visel | G06F 17/2785 |
| | | | | 704/9 |
| 2016/0358072 | A1* | 12/2016 | Hermann | G06N 3/0427 |
| 2017/0154108 | A1* | 6/2017 | Kraus | G06Q 10/105 |
| 2017/0154620 | A1* | 6/2017 | Berthelsen | G10L 15/16 |
| 2017/0270409 | A1* | 9/2017 | Trischler | G06F 17/2785 |
| 2017/0351663 | A1* | 12/2017 | Sordoni | G06F 17/278 |
| 2018/0060301 | A1* | 3/2018 | Li | G06F 17/2775 |
| 2018/0121539 | A1* | 5/2018 | Ciulla | G06F 16/367 |
| 2018/0174020 | A1* | 6/2018 | Wu | G06N 3/006 |
| 2019/0034416 | A1* | 1/2019 | Al Hasan | G06F 17/2785 |
| 2019/0172466 | A1* | 6/2019 | Lee | G06F 17/2715 |
| 2019/0188260 | A1* | 6/2019 | Hewitt | G06F 17/2785 |
| 2019/0205733 | A1* | 7/2019 | Ghaeini | G06K 9/6267 |
| 2019/0258933 | A1* | 8/2019 | Baughman | G06N 3/084 |

OTHER PUBLICATIONS

Kiros, Ryan, et al. "Skip-thought vectors." Advances in neural information processing systems. Dec. 2015, pp. 1-9. (Year: 2015).*

Rayner, Keith. "Eye movements in reading and information processing: 20 years of research." Psychological bulletin 124.3, Nov. 1998, pp. 372-422. (Year: 1998).*

Shen, Sheng-syun, et al. "Neural attention models for sequence classification: Analysis and application to key term extraction and dialogue act detection." arXiv preprint arXiv:1604.00077, Mar. 2016, pp. 1-5. (Year: 2016).*

Sordoni, Alessandro, et al. "Iterative alternating neural attention for machine reading." arXiv preprint arXiv:1606.02245, Nov. 2016, pp. 1-9. (Year: 2016).*

Stojanovski, Dario, et al. "Finki at semeval-2016 task 4: Deep learning architecture for twitter sentiment analysis." Proceedings of the 10th International workshop on semantic evaluation (SemEval-2016), Jun. 2016, pp. 149-154. (Year: 2016).*

Wang, Yequan, et al. "Attention-based LSTM for aspect-level sentiment classification." Proceedings of the 2016 conference on empirical methods in natural language processing. Nov. 2016, pp. 606-615. (Year: 2016).*

Yu, Adams Wei, Hongrae Lee, and Quoc V. Le. "Learning to skim text." arXiv preprint arXiv:1704.06877, Apr. 2017, pp. 1-11. (Year: 2017).*

Yuan, Zhigang, Yuting Hu, and Yongfeng Huang. "Learning to understand: Incorporating local contexts with global attention for sentiment classification." Nov. 2016, pp. 1-11. (Year: 2016).*

Yang, Zichao, et al. "Hierarchical attention networks for document classification." Proceedings of the 2016 conference of the North American chapter of the association for computational linguistics: human language technologies. Jun. 2016, pp. 1480-1489. (Year: 2016).*

Adams Wei Tu et al: "Learning to Skim Text", Apr. 23, 2017 (Apr. 23, 2017), XP055492503, Retrieved from the Internet: URL: https://arxiv.org/pdf/1704.06877v1.pdf [retrieved on Jul. 13, 2018] Section 2; figure 1.

Alex Graves et al: "Neural Turing Machines", Oct. 20, 2014 (Oct. 20, 2014), pp. 1-26, XP055239371, Retrieved from the Internet: URL: http://arxiv.org/pdf/1410.5401v1.pdf [retrieved on Jan. 7, 2016] the whole document.

Andor et al, "Globally normalized transition-based neural networks" arXiv, Jun. 2016, 12 pages.

Ba et al, "Multiple object recognition with visual attention" arXiv, Dec. 2014, 10 pages.

Bahdanau et al, "Neural machine translation by jointly learning to align and translate" arXiv, May 2016, 15 pages.

Chen et al, "A thorough examination of the cnn/daily mail reading comprehension task" arXiv, Aug. 2016, 11 pages.

Choi et al, "Hierarchical question answering for long documents" arXiv, Feb. 2017, 11 pages.

Collobert et al, "Natural language processing (almost) from scratch" Journal of Machine Learning Research, Aug. 2011, 45 pages.

Dai et al, "Semi-supervised sequence learning" arXiv, Nov. 2015, 10 pages.

Eunsol Choi et al: "Coarse-to-Fine Question Answering for Long Documents", Feb. 8, 2017 (Feb. 8, 2017), XP055492924, Retrieved from the Internet: URL: https://arxiv.org/pdf/1611.01839v2.pdf [retrieved on Jul. 16, 2018] the whole document.

Graves, "Adaptive computation time for recurrent neural networks" arXiv, Feb. 2017, 19 pages.

Hermann et al, "Teaching machines to read and comprehend" arXiv, Nov. 2015, 14 pages.

Hill et al, "The goldilocks principle: Reading children's books with explicit memory representations" arXiv, Apr. 2016, 13 pages.

Hochreiter et al, "Gradient flow in recurrent nets: the difficulty of learning long-term dependencies" A Field Guide to Dynamical Recurrent Neural Networks, 2001, 15 pages.

Hochreiter et al, "Long short-term memory" Neural Computation, 1997, 46 pages.

Junyoung Chung et al: "Hierarchical Multiscale Recurrent Neural Networks", Mar. 9, 2017 (Mar. 9, 2017), XP055487030, Retrieved from the Internet: URL: https://arxiv.org/pdf/1609.01704.pdf [retrieved on Jun. 22, 2018] the whole document.

Kalchbrenner et al, "Recurrent continuous translation models" Empirical Methods in Natural Language Processing, Oct. 2013, 10 pages.

Keyi Yu et al: "Workshop track—ICLR 2018 Fast and Accurate Text Classification: SKIM-MING, Rereading and Early Stopping", Feb. 15, 2018 (Feb. 15, 2018), XP055492891, Retrieved from the Internet: URL: https://openreview.net/pdf?id=r1w1Ad1vM [retrieved on Jul. 16, 2018] the whole document.

Kim, "Convolutional neural networks for sentence classification" arXiv, Sep. 2014, 6 pages.

Kingma et al, "Adam: A method for stochastic optimization" arXiv, Jan. 2017, 15 pages.

Koutnik et al, "A clockwork rnn" arXiv, Feb. 2014, 9 pages.

Le et al, "Distributed representations of sentences and documents" arXiv, May 2014, 9 pages.

Lee et al, "Learning recurrent span representations for extractive question answering" arXiv, Mar. 2017, 9 pages.

Lei et al, "Rationalizing Neural Predictions" arXiv, Nov. 2016, 11 pages.

Liang et al, "Neural symbolic machines: Learning semantic parsers on freebase with weak supervision" arXiv, Apr. 2017, 12 pages.

Maas et al, "Learning word vectors for sentiment analysis" Proceedings of the 49th Annual Meeting of the Association for Computational Linguistics Human Language Technologies, 2011, 9 pages.

Michael Hahn et al: "Modeling Human Reading with Neural Attention", ARXIV. ORG, Cornell University Library, 201 Olin Library Cornell University Ithaca, NY 14853, Aug. 19, 2016 (Aug. 19, 2016), XP080721128, Abstract; Sections 3, 4.1; figure 1.

Mikolov et al, "Distributed representations of words and phrases and their compositionality" Advances in neural information processing systems, 2013, 9 pages.

Mnih et al, "Recurrent models of visual attention" Advances in neural information processing systems, 2014, 9 pages.

Nallapati et al, "Abstractive text summarization using sequence-to-sequence RNNs and beyond" arXiv, Aug. 2016, 12 pages.

Pang et al, "Seeing stars: Exploiting class relationships for sentiment categorization with respect to rating scales" Proceedings of the 43rd Annual Meeting of the ACL, Jun. 2005, 10 pages.

PCT International Search Report and Written Opinion in International Application No. PCT/US2018/028618, dated Jul. 27, 2018, 19 pages.

Ranzato et al, "Sequence level training with recurrent neural networks" arXiv, May 2016, 16 pages.

Rush et al, "A neural attention model for abstractive sentence summarization" arXiv, Sep. 2015, 11 pages.

Sennrich et al, "Neural machine translation of rare words with subword units" Proceedings of the 54th Annual Meeting of the Association for Computational Linguistics, Aug. 2016, 11 pages.

Seo et al, "Bidirectional attention flow for machine comprehension" arXiv, Jun. 2018, 13 pages.

(56) References Cited

OTHER PUBLICATIONS

Sermanet et al, "Attention for fine-grained categorization" arXiv, Apr. 2015, 11 pages.
Shang et al, "Neural responding machine for short-text conversation" Proceedings of the 53rd Annual Meeting of the Association for Computational Linguistics and the 7th International Joint Conference on Natural Language Processing, Jul. 2015, 10 pages.
Shen et al, "Reasonet: Learning to stop reading in machine comprehension" arXiv, Jun. 2017, 9 pages.
Socher et al, "Recursive deep models for semantic compositionality over a sentiment treebank" EMNLP, 2013, 12 pages.
Socher et al, "Semi-supervised recursive autoencoders for predicting sentiment distributions" Proceedings of the 2011 Conference on Empirical Methods in Natural Language Processing, Jul. 2011, 11 pages.
Sordoni et al, "A neural network approach to context-sensitive generation of conversational responses" arXiv, Jun. 2015, 11 pages.
Sutskever et al, "Sequence to sequence learning with neural networks" Advances in neural information processing systems, 2014, 9 pages.
Trischler et al, "A parallel-hierachicaal model for machine comprehension on sparse data" arXiv, Mar. 2016, 9 pages.
Victor Campos et al: "Skip RNN: Learning to Skip State Updates in Recurrent Neural Networks", Feb. 5, 2018 (Feb. 5, 2018), XP055492888, Retrieved from the Internet: URL: https://arxiv.org/pdf/1708.06834.pdf [retrieved on Jul. 16, 2018] the whole document.
Vinyals et al, "A neural conversational model" arXiv, Jul. 2015, 8 pages.
Wang et al, "Multi-perspective context matching for machine comprehension" arXiv, Dec. 2016, 8 pages.
Wang et al, "Machine comprehension using match-lstm and answer pointer" arXiv, Nov. 2016, 11 pages.
Weston et al, "Towards ai-complete question answering: A set of prerequisite toy tasks" arXiv, Dec. 2015, 14 pages.
William et al, "Listen, attend, and spell" arXiv, Aug. 2015, 16 pages.
Williams, "Simple statistical gradient following algorithms for connectionist reinforcement learning" Machine Learning, 1992, 28 pages.
Wu et al, "Google's neural machine translation system: Bridging the gap between human and machine translation" arXiv, Oct. 2016, 23 pages.
Xiong et al, "Dynamic coattention networks for question answering" arXiv, Mar. 2018, 14 pages.
Yacine Jernite et al: "Variable Computation in Recurrent Neural Networks", Mar. 2, 2017 (Mar. 2, 2017), XP055492893, Retrieved from the Internet: URL: https://arxiv.org/pdf/1611.06188.pdf [retrieved on Jul. 16, 2018] the whole document.
Zaremba et al, "Reinforcement learning neural turing machines-revised" arXiv, Jan. 2016, 14 pages.
Zhang et al, "Character-level convolutional networks for text classification" arXiv, Apr. 2016, 9 pages.
PCT International Preliminary Report on Patentability in International Application No. PCT/US2018/028618, dated Oct. 22, 2019, 12 pages.

* cited by examiner

SKIMMING TEXT USING RECURRENT NEURAL NETWORKS

CROSS-REFERENCE TO RELATED APPLICATION

This application is a continuation of International Application No. PCT/US2018/028618, filed Apr. 20, 2018, which claims the benefit under 35 U.S.C. 119 of Provisional Application No. 62/488,013, filed Apr. 20, 2017, both of which are incorporated by reference.

BACKGROUND

This specification relates to processing sequential data using recurrent neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that processes sequential data using a recurrent neural network.

According to a first aspect there is provided a computer-implemented method for processing text sequences. The method includes receiving a request to generate a system output for an input text sequence. The input text sequence includes multiple tokens arranged in an input order. Each of the tokens are processed in the input order to generate a final internal state of a recurrent neural network. Specifically, for each token, the method includes determining whether the token has been designated as a token to be skipped during the processing of the tokens. When the token has not been designated as a token to be skipped, the token is processed using the recurrent neural network to update a current internal state of the recurrent neural network. When the token is not last in the input order, the method includes determining whether to designate one or more next tokens in the input order as tokens to be skipped. The system output is generated from the final internal state of the recurrent neural network.

In some implementations, the tokens comprise characters in a particular natural language.

In some implementations, the tokens comprise words in a particular natural language.

In some implementations, determining whether to designate one or more next tokens in the input order as tokens to be skipped includes determining whether a threshold number of tokens have been processed by the recurrent neural network since a most-recently skipped token. When less than the threshold number of tokens have been processed, a next token in the input order is not designated as a token to be skipped.

In some implementations, determining whether to designate one or more next tokens in the input order as tokens to be skipped includes, when the threshold number of tokens have been processed, processing the updated internal state through one or more neural network layers to generate a set of scores. The scores include a respective score for each of multiple position values. A position value is selected using the scores. The selected position value is used to determine how many next tokens in the input order to designate as tokens to be skipped.

In some implementations, selecting a position value includes sampling a position value in accordance with the scores.

In some implementations, selecting a position value includes selecting a position value having a highest score.

In some implementations, the plurality of position values include one or more non-negative integer values. When one of the non-negative integer values is selected, determining how many next tokens to designate includes designating a next N tokens in the input order as tokens to be skipped, wherein N is equal to the selected non-negative integer value.

In some implementations, the plurality of position values includes an end-of-processing value. When the end-of-processing value is selected, determining how many next tokens to designate includes designating each remaining token in the input order as a token to be skipped and designating the updated internal state as the final internal state.

In some implementations, when the token is last in the input order, the updated internal state is designated as the final internal state.

In some implementations, the method includes determining that more than a maximum number of determinations to designate one or more tokens as tokens to be skipped have been made. In response, the current internal state is designated as the final internal state.

In some implementations, the recurrent neural network is an attention-based recurrent neural network, and updating the current internal state comprises determining an attention vector over previously-processed tokens.

In some implementations, the recurrent neural network is an attention-based recurrent neural network and updating the current internal state comprises determining an attention vector over tokens processed after a most-recently skipped token.

In some implementations, the recurrent neural network is augmented with an external memory.

In some implementations, the recurrent neural network has been trained using a reinforcement learning technique.

In some implementations, the system output is a classification of a sentiment of the input text sequence. Generating the system output includes determining, from the final internal state, a respective sentiment score for each of multiple possible sentiments. A sentiment is selected from the possible sentiments using the sentiment scores.

In some implementations, the system output is a classification of a topic of the input text sequence. Generating the system output includes determining, from the final internal state, a respective topic score for each of multiple possible topics. A topic is selected from the possible topics using the topic scores.

In some implementations, the input text sequence includes a question text segment and a context text segment, and the system output is an answer to a question posed by the question text segment about the context segment. Generating the system output includes determining, from the final internal state, a respective answer score for each of multiple possible answers to the question. An answer is selected from the possible answers using the answer scores.

In some implementations, the tokens include sentences or other multi-word text segments.

According to a second aspect there is provided a system including one or more computers and one or more storage devices storing instructions that when executed by the one or more computers cause the one or more computers to perform the operations of the previously described method.

According to a third aspect there is provided one or more computer storage media storing instructions that when executed by one or more computers cause the one or more computers to perform the operations of the previously described method.

Particular embodiments of the subject matter described in this specification can be implemented so as to realize one or more of the following advantages.

The text processing system as described in this specification can process text sequences to effectively generate corresponding outputs (e.g., predicted topics of the text sequences) by processing only a fraction of the tokens in the text sequences with a recurrent neural network. More specifically, the system as described in this specification can be trained to adaptively skip portions of text sequences (i.e., by refraining from processing tokens from the skipped portions by the recurrent neural network) while generating corresponding outputs. In contrast, some conventional text processing systems process every token in text sequences with a recurrent neural network to generate corresponding outputs.

Accordingly, the system as described in this specification can generate outputs faster (in some cases, up to 6 times faster), while consuming fewer computational resources (e.g., memory and computing power), than some conventional systems. In particular, the system as described in this specification can effectively generate an output by processing only a fraction of the tokens that a conventional system would process to generate an output. For example, the system as described in this specification can designate multiple tokens as "tokens to be skipped". Tokens that are designated to be skipped are not processed by the recurrent neural network included in the system as described in this specification. Therefore, the system as described in this specification can, for example, perform fewer arithmetic operations (e.g., additions and multiplications) while generating outputs than some conventional systems, and thereby can operate faster and consume fewer computational resources.

Moreover, the system as described in this specification may generate outputs that are more accurate than those generated by some conventional systems. For example, since the system as described in this specification can skip some portions of text sequences, the system can focus on other portions that include the necessary information to accurately generate the output. On the other hand, conventional systems that process every token in text sequences to generate outputs may experience degraded performance (e.g., reduced prediction accuracy) for text sequences that include portions that are irrelevant to accurately determining the output. Conventional systems may assume that additional data improves performance, whereas it has been recognized that the system described in the specification can offer improved performance by working against this prejudice to reduce the text processed in order to determine an output.

The system as described in this specification may be better suited to processing very long text sequences (e.g., books) than conventional systems. In particular, while it may be computationally unfeasible for a conventional system to process a very long text sequence, the system as described in this specification may efficiently process the long text sequence by potentially skipping large parts of it. In addition, the system as described in this specification can skip irrelevant portions of the long text sequence and thereby generate a more accurate output than a conventional system which processes the irrelevant portions of the long text sequence.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
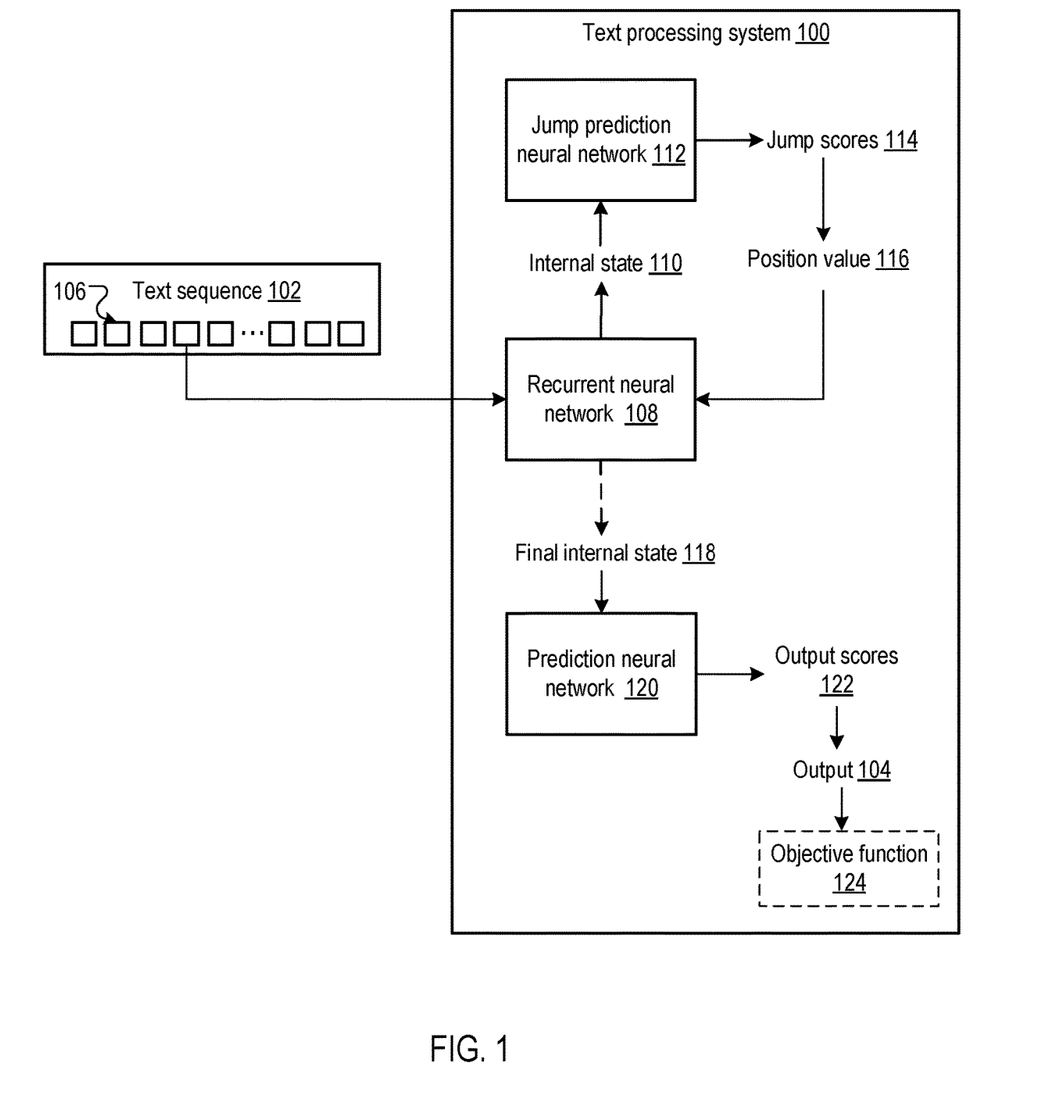
FIG. 1 is a block diagram of an example text processing system.

FIG. 1 shows an example text processing system 100. The text processing system 100 is an example of a system implemented as computer programs on one or more computers in one or more locations in which the systems, components, and techniques described below are implemented.

The system 100 processes a text sequence 102 in a particular natural language to generate an output 104. The text sequence 102 is represented by an ordered sequence of tokens (e.g., the token 106). The ordering of the tokens representing the text sequence 102 is referred to in this specification as the "input order". Generally, the tokens are numerical representations (e.g., as vectors or matrices) of components of the text sequence 102. For example, each of the tokens may be a representation of a respective character, word, or multi-word segment (e.g., sentence) in the text sequence 102. The output 104 can be any kind of score or classification output based on the text sequence 102.

While this specification generally describes processing text sequences, the skipping techniques described in this specification can also be used for more efficiently processing other kinds of sequences to generate other kinds of system outputs, e.g., for processing sequences of audio data, sequences of image data, sequences derived from electronic medical records, and so on.

The system 100 described herein is widely applicable and is not limited to one specific implementation. However, for illustrative purposes, a small number of example implementations are described below.

For example, the output 104 may indicate a sentiment (e.g., an emotion or outlook) expressed in the text sequence 102. In this example, if the text sequence 102 is a review (e.g., a product review or a movie review), then the output 104 may indicate whether the review expresses an overall positive, negative, or neutral view. In this example, if the text sequence 102 is an email, then the output 104 may indicate whether or not the contents of the email are urgent.

As another example, the output 104 may indicate a topic (e.g., a subject) of the text sequence 102. In this example, if the text sequence 102 is a news article, then the output 104 may indicate if the news article concerns, e.g., politics, sports, business, or science. In this example, if the text sequence 102 is a patent application, then the output 104 may indicate a technology area of the invention described in the patent application (e.g., mechanical technology, computer technology, or biomedical technology).

As another example, the output 104 may indicate an answer to a question posed by a question text segment in the text sequence 102. In this example, the text sequence 102 includes a question text sequence and a context text sequence, where the question text sequence poses a question about the context text sequence. In a particular example, the context text sequence may be a product review of a given product, and the question text sequence may pose the question: "what did the customer most like about the given product?".

The system 100 includes a recurrent neural network 108 that is configured to, at each of multiple time steps, process a respective token from the text sequence 102 in accordance with current values of recurrent neural network parameters to update an internal state 110 of the recurrent neural network 108. An internal state of a recurrent neural network refers to activations (represented as numerical values) generated by one or more neurons of the recurrent neural network 108 in response to processing an input to the recurrent neural network (e.g., a token from the text sequence 102). The internal state 110 of the recurrent neural network 108 persists between time steps, that is, the value of the internal state 110 at the end of one time step is the same as the value of the internal state 110 at the beginning of the next time step. The internal state 110 may be represented in any appropriate numerical format, for example, as a vector or as a matrix.

The recurrent neural network 108 may be implemented as any appropriate neural network that maintains an internal state between time steps, for example, as a long short-term memory (LSTM) network, a recurrent neural network with gated recurrent units, or a recurrent multi-layer perceptron network (RMLP). In some cases, the recurrent neural network 108 may be augmented by an external memory. An external memory refers to a location (e.g., in a logical data storage area or on a physical data storage device) where data can be dynamically stored and retrieved during operation of the recurrent neural network 108 (e.g., to enhance the prediction performance of the recurrent neural network 108). In some cases, the recurrent neural network 108 may be an attention-based recurrent neural network (as described further with reference to FIG. 3).

The system 100 may, in some cases, provide fewer than all the tokens from the text sequence 102 as inputs to the recurrent neural network 108. For example, in some cases, the system 100 provides fewer than half the tokens from the text sequence 102 as inputs to the recurrent neural network 108. More specifically, while processing the text sequence 102, the system 100 can designate multiple tokens from the text sequence 102 as tokens to be skipped (i.e., tokens that are not to be provided to or processed by the recurrent neural network 108). By designating multiple tokens from the text sequence 102 as tokens to be skipped, the system 100 can reduce the time and computational resources necessary to generate the output 104, and can be said to "skim" the text sequence 102.

The system 100 sequentially processes each token from the text sequence 102 in the input order of the text sequence 102. For each token, the system 100 determines whether the token has been designated as a token to be skipped. In response to determining that a respective token has been designated as a token to be skipped, the system 100 refrains from providing the respective token as an input to be processed by the recurrent neural network 108. Rather, the system 100 proceeds to process the next token in the text sequence 102 (i.e., the token after the respective token in the input order) without providing the respective token as an input to be processed by the recurrent neural network 108. In response to determining that a respective token has not been designated as a token to be skipped, the system 100 provides the respective token as an input to the recurrent neural network 108. Upon receiving the respective token as an input, the recurrent neural network 108 processes the respective token to update an internal state 110 of the recurrent neural network 108.

After the recurrent neural network 108 processes a respective token from the text sequence 102 to update the internal state 110 of the recurrent neural network 108, the system 100 determines whether to designate one or more next tokens in the text sequence (i.e., tokens after the respective token in the input order) as tokens to be skipped.

As will be described in more detail with reference to FIG. 3, the system 100 can determine which tokens to designate as tokens to be skipped using a jump prediction neural network 112. More specifically, after the recurrent neural network 108 processes a respective token from the text sequence 102 to update the internal state 110 of the recurrent neural network 108, the system 100 may provide the updated internal state 110 of the recurrent neural network 108 as an input to the jump prediction neural network 112. The jump prediction neural network 112 is configured to process the updated internal state 110 of the recurrent neural network 108 in accordance with current values of jump prediction neural network parameters to generate as output a set of jump scores 114.

The jump scores 114 are numerical data that include a respective score (e.g., represented as a numerical value) for each position value in a set of multiple position values. Each position value in the set of multiple position values may be, for example, a numerical value (e.g., a non-negative integer value) or a special position value referred to as an end-of-processing value (to be described in more detail later). For example, the set of position values may be given by: {0, 1, 2, 3, 4, EOP}, where EOP represents an end-of-processing value.

The system 100 selects a position value 116 from the set of position values based on the jump scores 114. In some implementations, the system 100 selects a position value 116 based on the jump scores 114 by sampling from the set of position values in accordance with the jump scores 114. For example, the system 100 may determine a probability distribution over the set of position values from the jump scores 114 (e.g., by processing the jump scores 114 using a soft-max function) and sample a position value 116 in accordance with the probability distribution. In some implementations, the system 100 selects a position value 116 based on the jump scores 114 by selecting a position value from the set of position values with a highest score according to the jump scores 114.

From the selected position value 116, the system 100 determines how many next tokens (i.e., after the current token processed by the recurrent neural network 108) are designated as tokens to be skipped. For example, if the set of position values includes one or more non-negative integer position values, and the selected position value 116 is a non-negative integer position value N, then the system 100 may designate the next N tokens in text sequence 102 as tokens to be skipped.

Each time the recurrent neural network 108 processes a respective token from the text sequence 102 to update the internal state 110 of the recurrent neural network 108, the system 100 determines whether a termination criterion is met. In response to determining that a termination criterion is met, the system 100 designates the updated internal state 110 as a final internal state 118 and generates the output 104 from the final internal state 118.

For example, the termination criterion may be that the respective token processed by the recurrent neural network 108 is the last token (i.e., with respect to the input order) in the text sequence 102. As another example, the termination criterion may be that the selected position value 116 is a specially designated end-of-processing value. As another example, the termination criterion may be that the system 100 has made more than a predetermined maximum number of determinations to designate one or more tokens as tokens to be skipped (i.e., the system has made from than a predetermined maximum number of "jumps").

The system generates the output 104 from the final internal state 118. For example, the system 100 may provide the final internal state 118 of the recurrent neural network 108 as an input to a prediction neural network 120. The prediction neural network 120 is configured to process the final internal state 118 in accordance with current values of prediction neural network parameters to generate as output a set of output scores 122.

The output scores 122 are numerical data that include a respective score (e.g., represented as a numerical value) for each output in a set of multiple possible outputs. For example, the output scores 122 may include a respective sentiment score for each of multiple possible sentiments expressed in the text sequence 102 (as described earlier). As another example, the output scores 122 may include a respective topic score for each of multiple possible topics of the text sequence 102 (as described earlier). As another example, the output scores 122 may include a respective answer score for each of multiple possible answers to a question expressed in the text sequence 102 (as described earlier).

The system 100 may select an output 104 from the set of possible outputs based on the output scores 122. In some implementations, the system 100 selects an output 104 based on the output scores 122 by sampling from the set of possible outputs in accordance with the output scores 122. For example, the system 100 may determine a probability distribution over the set of possible outputs from the output scores 122 (e.g., by processing the output scores 122 using a soft-max function) and sample an output 104 in accordance with the probability distribution. In some implementations, the system 100 selects an output 104 based on the output scores 122 by selecting an output 104 from the set of possible outputs with a highest score according to the output scores 122.

The jump prediction neural network 112 and the prediction neural network 120 each include one or more neural network layers and can be implemented by any appropriate neural network models. For example, the jump prediction neural network 112 and the prediction neural network 120 can include fully-connected layers, convolutional layers, or both. In some cases, the output layers of the jump prediction neural network 112 and the prediction neural network 120 are soft-max layers.

The system 100 can jointly train the recurrent neural network 108, the jump prediction neural network 112, and the prediction neural network 120 to determine trained values of their respective parameters. More specifically, the system 100 can jointly train the recurrent neural network 108, the jump prediction neural network 112, and the prediction neural network 120 by repeatedly updating their parameter values based on a gradient of an objective function 124. As will be described further with reference to FIG. 5, the objective function 124 may promote generating accurate outputs 104 (i.e., outputs that should be generated in response to processing respective text sequences 102 based on a set of training data).

Figure 2:
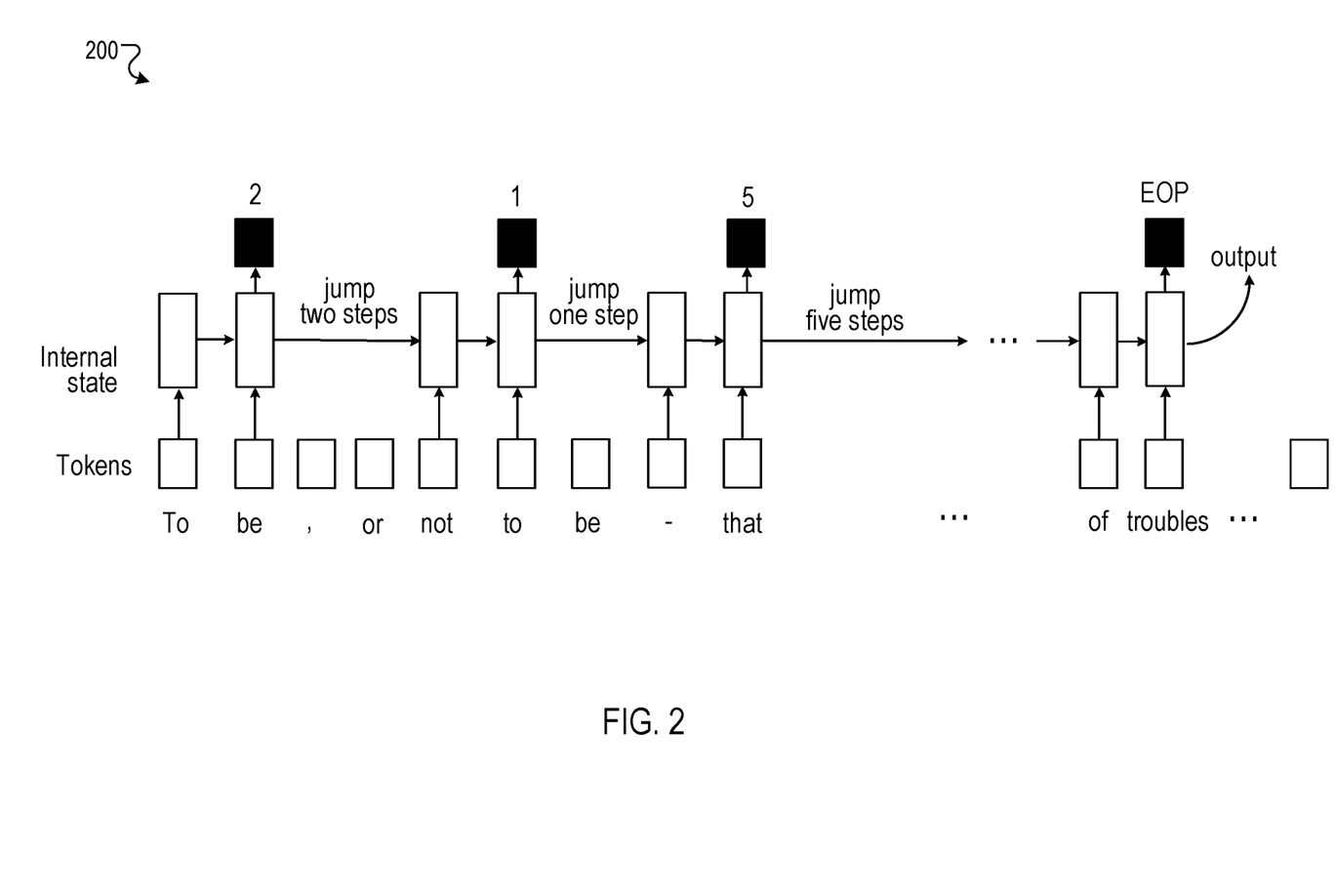
FIG. 2 shows an example of processing a text sequence by a text processing system.

FIG. 2 shows an example of processing a text sequence by a text processing system, for example, the text processing system 100 of FIG. 1. In this example, the initial portion of the text sequence includes the phrase: "To be, or not to be". The tokens are word embeddings, that is, numerical representations (e.g., as vectors or matrices) of words of the text sequence. In this example, when less than a threshold number of tokens (in this case, two) have been processed since a most-recently skipped token (or since the first token in the text sequence), the system determines not to designate a next token in the input order as a token to be skipped (as described further with reference to 402-406).

The system provides the token corresponding to the word "To" to the recurrent neural network, which processes the token and updates the internal state of the recurrent neural network. The system determines not to designate the next token, which corresponds to the word "be", as a token to be skipped since it is within two tokens of the first token in the sequence.

Next, the system processes the token corresponding to the word "be" and determines the token corresponding to the word "be" has not been designated as a token to be skipped. The system provides the token corresponding to the word "be" to the recurrent neural network, which processes the token and updates the internal state of the recurrent neural network. The system provides the updated internal state of the recurrent neural network to the jump prediction neural network and determines (based on the output of the jump prediction neural network) that the next two tokens in the input order (i.e., the tokens corresponding to the words "," and "or") are designated as tokens to be skipped. That is, based on the output of the jump prediction neural network, the system determines that it should "jump two steps" in the text sequence.

Subsequently, the system continues to process the tokens from the text sequence by providing some of them as inputs to be processed by the recurrent neural network and by designating others as tokens to be skipped. Eventually, the system provides the updated internal state of the recurrent neural network after processing the token corresponding to the word "troubles" to the jump prediction neural network. Based on the output of the jump prediction neural network, the system determines the position value to be the specially designated end-of-processing value EOP. As a result, the system determines that a termination criterion is met, designates the updated internal state of the recurrent neural network as the final internal state, and generates the output from the final internal state.

Figure 3:
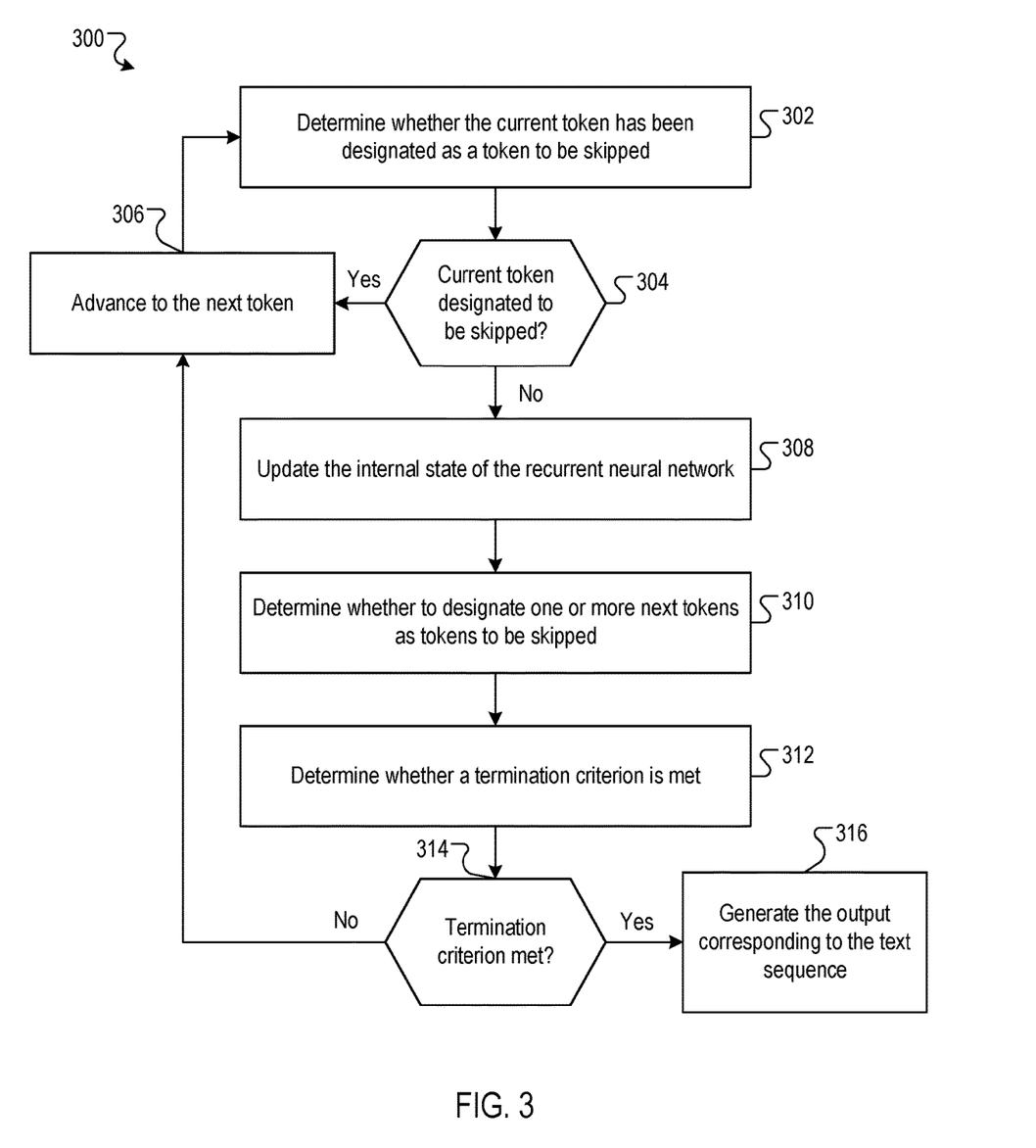
FIG. 3 is a flow diagram of an example process for processing a text sequence by a text processing system.

FIG. 3 is a flow diagram of an example process for processing a text sequence by a text processing system. The system performs the steps of the process 300 by sequentially processing the tokens in the text sequence, starting with the first token in the text sequence. For convenience, the process 300 will be described as being performed by a system of one or more computers located in one or more locations. For example, a text processing system, e.g., the text processing system 100 of FIG. 1, appropriately programmed in accordance with this specification, can perform the process 300.

The system determines whether the current token (i.e., the token the system is currently processing) has been designated as a token to be skipped (302). For example, for each token, the system may store (e.g., in a logical data storage area or physical data storage device) data including an identifier (e.g., a numeric identifier) for the token and corresponding data indicating whether the token is designated as a token to be skipped. The system may determine whether the current token has been designated as a token to be skipped by matching the identifier of the current token with the same token identifier in the stored data, and determining whether the corresponding data indicates that the token is designated as a token to be skipped.

In response to determining that the current token is designated as a token to be skipped (304), the system advances to the next token (306), returns to 302, and repeats the preceding steps.

In response to determining that the current token is not designated as a token to be skipped (304), the system updates the internal state of the recurrent neural network (308). More specifically, the system provides an input including the current token to the recurrent neural network. The recurrent neural network processes the input in accordance with current values of recurrent neural network parameters to update the internal state of the recurrent neural network.

In some implementations, the recurrent neural network is an attention-based recurrent neural network. In these implementations, the system may provide an input to the recurrent neural network that includes not only the current token, but also one or more previously processed tokens. For example, the system may provide an input to the recurrent neural network that includes: (i) each token previously processed by the recurrent neural network, or (ii) each token previously processed by the recurrent neural network after a most-recently skipped token. The system may determine an attention vector over the current token and the previously processed tokens, where the attention vector may include a respective numerical value for the current token and each of the previously processed tokens. The system may determine a linear combination of the current token and the one or more previously processed tokens, where the coefficients of the linear combination are given by the respective numerical values included in the attention vector. Finally, in these implementations, the recurrent neural network may update the internal state of the recurrent neural network by processing the linear combination of the current token and the one or more previous tokens.

The system determines whether to designate one or more next tokens in the text sequence as tokens to be skipped (310). An example process for determining whether to designate one or more next tokens in the text sequence as tokens to be skipped is described with reference to FIG. 4. If the system designates one or more next tokens in the text sequence as tokens to be skipped, the system may update stored data (e.g., stored in a logical data storage area or physical data storage device) that includes, for each token, an identifier (e.g., a numeric identifier) for the token and corresponding data indicating whether the token is designated as a token to be skipped. In particular, the system may match the identifiers of the tokens that are designated to be skipped with the same token identifiers in the stored data, and update the data corresponding to the matched identifiers to reflect that the tokens are now designated as tokens to be skipped.

The system determines whether a termination criterion is met (312). For example, the termination criterion may be that the respective token processed by the recurrent neural network is the last token (i.e., with respect to the input order) in the text sequence. As another example, the termination criterion may be that selected position value is a specially designated end-of-processing value. As another example, the termination criterion may be that the system has made more than a maximum number of determinations to designate one or more tokens as tokens to be skipped (e.g., as determined in 310).

In response to determining that a termination criterion is not met (314), the system advances to the next token (306), returns to 302, and repeats the preceding steps.

In response to determining that a termination criterion is met (314), the system generates the output corresponding to the text sequence (316). More specifically, the system designates the updated internal state of the recurrent neural network (e.g., as determined in 308) as the final internal state of the recurrent neural network, and generates the output from the final internal state of the recurrent neural network.

For example, the system may provide the final internal state of the recurrent neural network as an input to a prediction neural network. The prediction neural network is configured to process the final internal state in accordance with current values of prediction neural network parameters to generate as output a set of output scores.

The output scores are numerical data that include a respective score (e.g., represented as a numerical value) for each output in a set of multiple possible outputs. For example, the output scores may include a respective sentiment score for each of multiple possible sentiments expressed in the text sequence (as described earlier). As another example, the output scores may include a respective topic score for each of multiple possible topics of the text sequence (as described earlier). As another example, the output scores may include a respective answer score for each of multiple possible answers to a question expressed in the text sequence (as described earlier).

The system may select an output from the set of possible outputs based on the output scores. In some implementations, the system selects an output based on the output scores by sampling from the set of possible outputs in accordance with the output scores. For example, the system may determine a probability distribution over the set of possible outputs from the output scores (e.g., by processing the output scores using a soft-max function) and sample an output in accordance with the probability distribution. In some implementations, the system selects an output based on the output scores by selecting an output from the set of possible outputs with a highest score according to the output scores.

Figure 4:
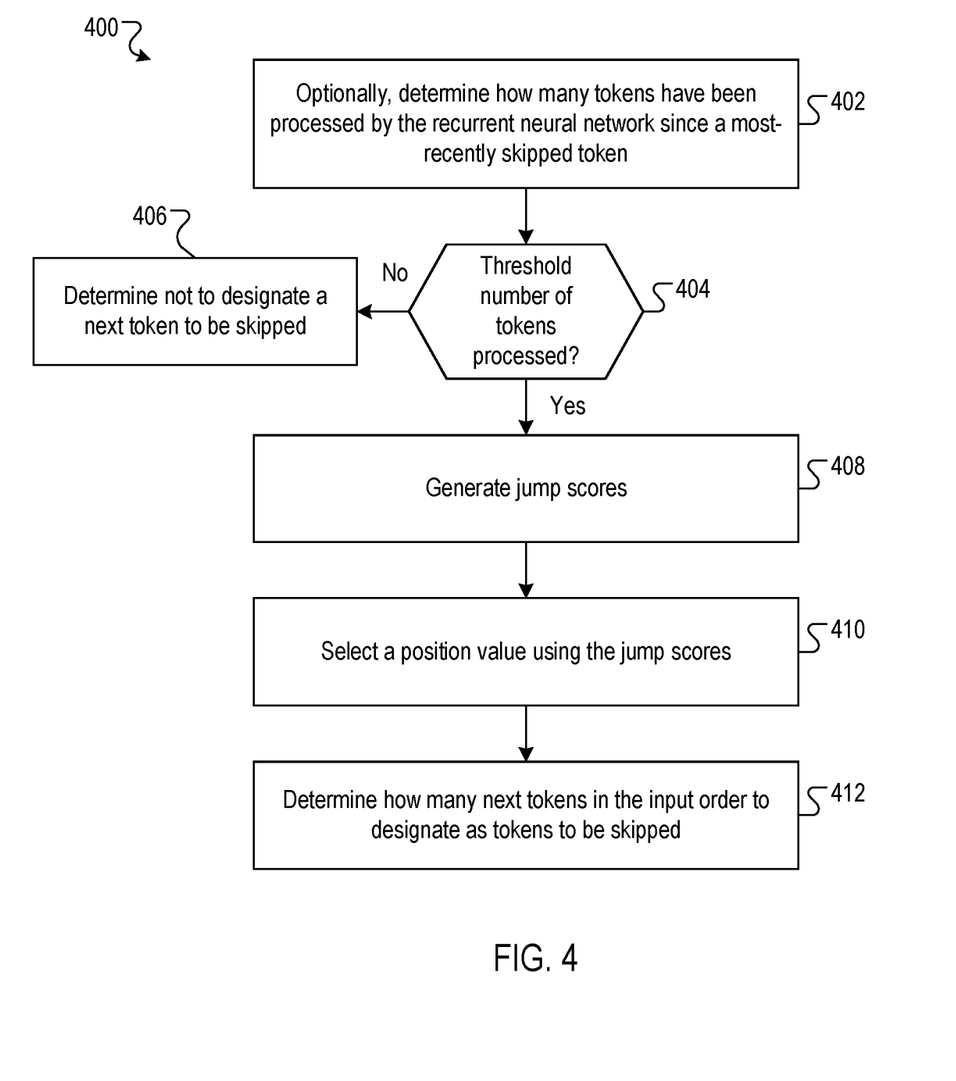
FIG. 4 is a flow diagram of an example process for determining whether to designate one or more next tokens as tokens to be skipped while processing a text sequence.

FIG. 4 is a flow diagram of an example process for determining whether to designate one or more next tokens as tokens to be skipped while processing a text sequence. For convenience, the process 400 will be described as being performed by a system of one or more computers located in one or more locations. For example, a text processing system, e.g., the text processing system 100 of FIG. 1, appropriately programmed in accordance with this specification, can perform the process 400.

Optionally, the system determines how many tokens have been processed by the recurrent neural network since a most-recently skipped token (or since the first token in the text sequence) (402). In a particular example, referring to FIG. 2, after the recurrent neural network processes the token corresponding the word "not", the recurrent neural network has processed one token since the most recently skipped token (i.e., the token corresponding to the word "or"). The system can determine how many tokens have been processed by the recurrent neural network since a most-recently skipped token by accessing stored data including token identifiers and corresponding data indicating whether the token is designated as a token to be skipped (e.g., as described with reference to 302).

In response to determining that less than a threshold number of tokens have been processed by the recurrent neural network since a most-recently skipped token (404), the system determines not to designate a next token as a token to be skipped (406).

In response to determining that at least a threshold number of tokens have been processed by the recurrent neural network since a most-recently skipped token (404), the system generates a set of jump scores (408). The jump scores are numerical data that include a respective score (e.g., represented as a numerical value) for each position value in a set of multiple position values. Each position value in the set of multiple position values may be, for example, a numerical value (e.g., a non-negative integer value) or a special position value referred to as an end-of-processing value (to be described in more detail later). For example, the set of position values may be given by: {0, 1, 2, 3, 4, EOP}, where EOP represents an end-of-processing value.

The system can generate the jump scores by providing the updated internal state of the recurrent neural network (e.g., as determined in 308) as an input to a jump prediction neural network. The jump prediction neural network is configured to process the updated internal state of the recurrent neural network in accordance with current values of jump prediction neural network parameters to generate as output the set of jump scores. The jump prediction neural network includes one or more neural network layers and can be implemented by any appropriate neural network model. For example, the jump prediction neural network can include fully-connected layers, convolutional layers, or both. In some cases, the output layer of the jump prediction neural network is a soft-max layer.

The system selects a position value from the set of position values based on the jump scores (410). In some implementations, the system selects a position value based on the jump scores by sampling from the set of position values in accordance with the jump scores. For example, the system may determine a probability distribution over the set of position values from the jump scores (e.g., by processing the jump scores using a soft-max function) and sample a position value in accordance with the probability distribution. In some implementations, the system selects a position value based on the jump scores by selecting a position value from the set of position values with a highest score according to the jump scores.

The system determines how many next tokens in the input order to designate as tokens to be skipped from the selected position value (412). For example, if the set of position values includes one or more non-negative integer position values, and the selected position value 116 is a non-negative integer position value N, then the system 100 may designate the next N tokens in text sequence 102 as tokens to be skipped.

Figure 5:
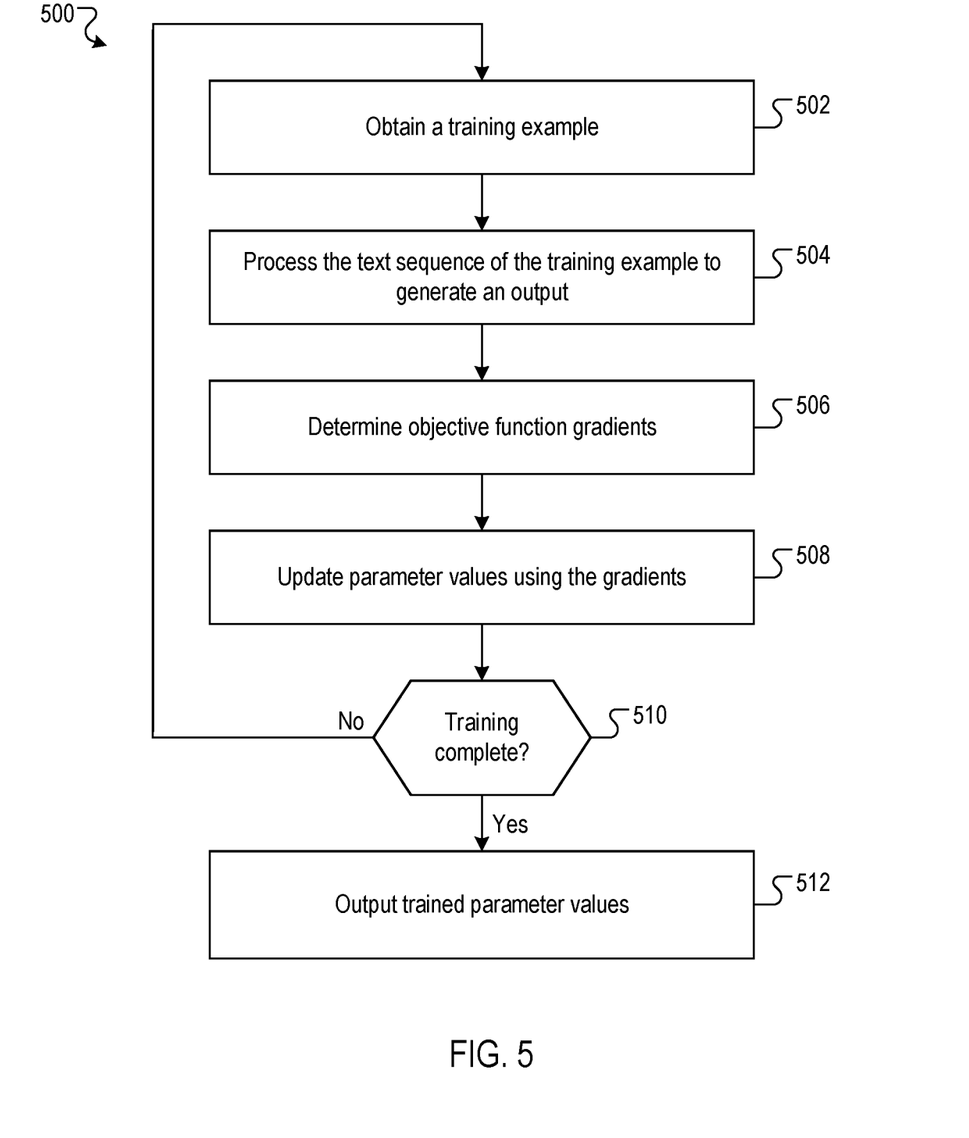
FIG. 5 is a flow diagram of an example process for training a text processing system.

FIG. 5 is a flow diagram of an example process for training a text processing system. For convenience, the process 500 will be described as being performed by a system of one or more computers located in one or more locations. For example, a text processing system, e.g., the text processing system 100 of FIG. 1, appropriately programmed in accordance with this specification, can perform the process 500.

The system obtains a training example (502). The training example includes a text sequence and a corresponding target output that should be generated by the system in response to processing the text sequence. In general, the system obtains a batch of multiple training examples, and performs the steps 504-508 for each training example in the batch. For brevity, the description which follows (i.e., of steps 504-508) is described with reference to a single training example.

The system processes the text sequence included in the training example to generate a corresponding output (504). An example process for processing a text sequence to generate a corresponding output is described with reference to FIG. 3.

The system determines gradients of an objective function with respect to the system parameters (e.g., the parameters of the recurrent neural network, the jump prediction neural network, and the prediction neural network) (506). The objective function may promote generating accurate outputs (i.e., outputs that match the target outputs specified by training examples).

In some cases, the objective function may include: (i) a first term that depends a similarity between the output (i.e., as generated in 504) and the target output (i.e., as specified by the training example), and (ii) a second term that depends on a reward received by the system. The reward may be received by the system after it processes the text sequence to generate the corresponding output. The reward is typically represented as a numerical value. The system may receive a higher reward for generating an output that matches the target output, and a lower reward for generating an output that is different than the target output. In a particular example, the system may receive a reward of +1 when the output matches the target output, and a reward of −1 when the output is different than the target output. When the objective function includes a term that depends on a reward received by the system, the system may be said to be trained by a reinforcement learning training technique.

The objective function may be given by:

$$\mathcal{L}(\theta_m, \theta_a) = \mathcal{L}_1(\theta_m) + \mathcal{L}_2(\theta_a) \tag{1}$$

where $\theta_m$ are the parameters of the recurrent neural network and the prediction neural network, $\theta_a$ are the parameters of the jump prediction neural network, $\mathcal{L}_1(\theta_m)$ depends on a similarity between the output and the target output, and $\mathcal{L}_2(\theta_a)$ depends on an expected reward received by the system. In this example, the term $\mathcal{L}_1(\theta_m)$ may be any appropriate classification or regression loss (e.g., a cross-entropy loss or a squared-error loss). In this example, $\mathcal{L}_2(\theta_a)$ may be given by:

$$\mathcal{L}_2(\theta_a) = \mathbb{E}[R] \qquad (2)$$

where $\mathbb{E}[\cdot]$ indicates a probabilistic expectation operator and R is the reward received by the system (as described previously).

The system may determine the gradient of the objective function with respect to the parameters of the recurrent neural network, jump prediction neural network, and prediction neural network by any appropriate procedure. For example, the system may determine the gradient of the objective function by a backpropagation procedure, such as backpropagation-through-time. In a particular example, the system may determine the gradient of the objective function term $\mathcal{L}_2(\theta_a)$ (as given in (2)) with respect to the parameters of the jump prediction neural network as:

$$\nabla_{\theta_a} \mathcal{L}_2(\theta_a) = \sum_{i=1}^{N} \nabla_{\theta_a} \log p(j_i) \cdot R \qquad (3)$$

where $\nabla_{\theta_a}$ denotes the gradient with respect to the parameters of the jump prediction neural network (i.e., computed by a backpropagation procedure), N is a maximum number of determinations the system can make to designate one or more tokens as tokens to be skipped (i.e., a maximum number of "jumps"), $p(j_i)$ is a jump score (i.e., as described with reference to 408) of the position value selected during the i-th determination to designate one or more tokens as tokens to be skipped (i.e., the i-th "jump"), and R is the reward received by the system. By determining the gradient with respect to the parameters of the jump prediction neural network by a reinforcement learning technique, the system obviates potential numerical difficulties caused by the non-differentiability of the discrete position values selected based on the output of the jump prediction neural network.

The system updates the current values of the recurrent neural network parameters, the jump distribution neural network parameters, and the prediction neural network parameters using the gradient of the objective function (508). For a given parameter θ, the system may update the current value of the parameter by:

$$\theta \leftarrow \theta - r \cdot \nabla_{\theta} \mathcal{L} \qquad (4)$$

where r is a positive learning rate hyper-parameter (i.e., a system hyper-parameter governing how quickly parameter values can change during training) and $\nabla_{\theta} \mathcal{L}$ is the gradient of the objective function with respect to the parameter θ (e.g., as determined in 506).

The system determines if the training is complete (510). In some implementations, the system determines the training is complete if a predetermined number of training iterations (i.e., repetitions of 502-508) have been completed. In some implementations, the system determines the training is complete when a difference in the value of the objective function between training iterations falls below a predetermined threshold.

In response to determining that the training is not complete, the system returns to 502 and repeats the preceding steps. Thus, the system repeatedly trains the recurrent neural network, the jump prediction neural network, and the prediction neural network on different batches of training examples. In response to determining that the training is complete (510), the system outputs the trained parameter values (e.g., of the recurrent neural network, the jump prediction neural network, and the prediction neural network) (512).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving a request to generate a system output for an input text sequence, the input text sequence comprising a plurality of tokens arranged in an input order;
processing each of the plurality of tokens in the input order to generate a final internal state of a recurrent neural network, comprising, for each of the plurality of tokens:
determining whether the token has been designated as a token to be skipped during the processing of the plurality of tokens;
when the token has not been designated as a token to be skipped:
processing the token using the recurrent neural network to update a current internal state of the recurrent neural network, and
when the token is not last in the input order, determining whether to designate one or more next tokens in the input order as tokens to be skipped;
wherein one or more tokens of the plurality of tokens are not designated as tokens to be skipped;
wherein for one or more of the tokens that are not designated as tokens to be skipped, determining whether to designate one or more next tokens in the input order as tokens to be skipped comprises:
processing the updated internal state of the recurrent neural network through one or more neural network layers to generate a set of scores that comprises a respective score for each of a plurality of position values; and
determining, based on the scores for the plurality of position values, that a plurality of next tokens in the input order are designated as tokens to be skipped; and
generating the system output from the final internal state of the recurrent neural network.

2. The method of claim 1, wherein the tokens comprise characters in a particular natural language.

3. The method of claim 1, wherein the tokens comprise words in a particular natural language.

4. The method of claim 1, wherein determining whether to designate one or more next tokens in the input order as tokens to be skipped comprises:
determining whether a threshold number of tokens have been processed by the recurrent neural network since a most-recently skipped token; and
when less than the threshold number of tokens have been processed, determining not to designate a next token in the input order as a token to be skipped.

5. The method of claim 1, wherein determining, based on the scores for the plurality of position values, that a plurality of next tokens in the input order are designated as tokens to be skipped comprises:
selecting one of the plurality of position values using the scores; and
determining how many next tokens in the input order to designate as tokens to be skipped from the selected position value.

6. The method of claim 5, wherein selecting one of the plurality of position values comprises:
sampling from the plurality of position values in accordance with the scores.

7. The method of claim 5, wherein selecting one of the plurality of position values comprises:
selecting a position value having a highest score.

8. The method of claim 5, wherein the plurality of position values include one or more non-negative integer values, and wherein, when one of the non-negative integer values is selected, determining how many next tokens to designate comprises:
designating a next N tokens in the input order as tokens to be skipped, wherein N is equal to the selected non-negative integer value.

9. The method of claim 5, wherein the plurality of position values includes an end-of-processing value, and wherein when the end-of-processing value is selected, determining how many next tokens to designate comprises:
designating each remaining token in the input order as a token to be skipped and designating the updated internal state as the final internal state.

10. The method of claim 1, further comprising:
when the token is last in the input order, designating the updated internal state as the final internal state.

11. The method of claim 1, further comprising:
determining that more than a maximum number of determinations to designate one or more tokens as tokens to be skipped have been made; and
in response, designating the current internal state as the final internal state.

12. The method of claim 1, wherein the recurrent neural network is an attention-based recurrent neural network and wherein updating the current internal state comprises determining an attention vector over previously-processed tokens.

13. The method of claim 1, wherein the recurrent neural network is an attention-based recurrent neural network and wherein updating the current internal state comprises determining an attention vector over tokens processed after a most-recently skipped token.

14. The method of claim 1, wherein the recurrent neural network is augmented with an external memory.

15. The method of claim 1, wherein the recurrent neural network has been trained using a reinforcement learning technique.

16. The method of claim 1, wherein the system output is a classification of a sentiment of the input text sequence, and wherein generating the system output comprises:
determining, from the final internal state, a respective sentiment score for each of a plurality of possible sentiments; and
selecting a sentiment from the possible sentiments using the sentiment scores.

17. The method of claim 1, wherein the system output is a classification of a topic of the input text sequence, and wherein generating the system output comprises:
determining, from the final internal state, a respective topic score for each of a plurality of possible topic; and
selecting a topic from the possible topics using the topic scores.

18. The method of claim 1, wherein the input text sequence comprises a question text segment and a context text segment, wherein the system output is an answer to a question posed by the question text segment about the context segment, and wherein generating the system output comprises:
  determining, from the final internal state, a respective answer score for each of a plurality of possible answers to the question; and
  selecting an answer from the possible answers using the answer scores.

19. The method of claim 1, wherein the tokens comprise sentences or other multi-word text segments.

20. A system comprising one or more computers and one or more storage devices storing instructions that when executed by the one or more computers cause the one or more computers to perform operations comprising:
  receiving a request to generate a system output for an input text sequence, the input text sequence comprising a plurality of tokens arranged in an input order;
  processing each of the plurality of tokens in the input order to generate a final internal state of a recurrent neural network, comprising, for each of the plurality of tokens:
    determining whether the token has been designated as a token to be skipped during the processing of the plurality of tokens;
    when the token has not been designated as a token to be skipped:
      processing the token using the recurrent neural network to update a current internal state of the recurrent neural network, and
      when the token is not last in the input order, determining whether to designate one or more next tokens in the input order as tokens to be skipped;
  wherein one or more tokens of the plurality of tokens are not designated as tokens to be skipped;
  wherein for one or more of the tokens that are not designated as tokens to be skipped, determining whether to designate one or more next tokens in the input order as tokens to be skipped comprises:
    processing the updated internal state of the recurrent neural network through one or more neural network layers to generate a set of scores that comprises a respective score for each of a plurality of position values; and
    determining, based on the scores for the plurality of position values, that a plurality of next tokens in the input order are designated as tokens to be skipped; and
  generating the system output from the final internal state of the recurrent neural network.

21. One or more non-transitory computer storage media storing instructions that when executed by one or more computers cause the one or more computers to perform operations comprising:
  receiving a request to generate a system output for an input text sequence, the input text sequence comprising a plurality of tokens arranged in an input order;
  processing each of the plurality of tokens in the input order to generate a final internal state of a recurrent neural network, comprising, for each of the plurality of tokens:
    determining whether the token has been designated as a token to be skipped during the processing of the plurality of tokens;
    when the token has not been designated as a token to be skipped:
      processing the token using the recurrent neural network to update a current internal state of the recurrent neural network, and
      when the token is not last in the input order, determining whether to designate one or more next tokens in the input order as tokens to be skipped;
  wherein one or more tokens of the plurality of tokens are not designated as tokens to be skipped;
  wherein for one or more of the tokens that are not designated as tokens to be skipped, determining whether to designate one or more next tokens in the input order as tokens to be skipped comprises:
    processing the updated internal state of the recurrent neural network through one or more neural network layers to generate a set of scores that comprises a respective score for each of a plurality of position values; and
    determining, based on the scores for the plurality of position values, that a plurality of next tokens in the input order are designated as tokens to be skipped; and
  generating the system output from the final internal state of the recurrent neural network.

* * * * *